(12) United States Patent
Ruoff et al.

(10) Patent No.: US 6,273,032 B1
(45) Date of Patent: Aug. 14, 2001

(54) DUAL NOZZLE FOR INJECTING FUEL AND AN ADDITIONAL FLUID

(75) Inventors: Manfred Ruoff, Moeglingen; Horst Harndorf, Schwieberdingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/331,720

(22) PCT Filed: Jul. 14, 1998

(86) PCT No.: PCT/DE98/01960

§ 371 Date: Jul. 28, 1999

§ 102(e) Date: Jul. 28, 1999

(87) PCT Pub. No.: WO99/22133

PCT Pub. Date: May 6, 1999

(30) Foreign Application Priority Data

Oct. 25, 1997 (DE) .............................. 197 47 268

(51) Int. Cl.[7] .................................. F02M 43/04
(52) U.S. Cl. .......................................... 123/25 R
(58) Field of Search .................. 123/575, 25 R, 123/25 C, 467, 304, 25 D; 239/410, 408, 407, 533.9, 533.2

(56) References Cited

U.S. PATENT DOCUMENTS

| | | | | |
|---|---|---|---|---|
| 5,397,061 | * | 3/1995 | Buchholz et al. | 239/408 |
| 5,762,033 | * | 6/1998 | Rembold et al. | 123/25 R |
| 6,067,964 | * | 5/2000 | Ruoff et al. | 123/585 |

* cited by examiner

Primary Examiner—Willis R. Wolfe
Assistant Examiner—Hyder Ali
(74) Attorney, Agent, or Firm—Ronald E. Greigg; Edwin E. Greigg

(57) ABSTRACT

A dual-substance nozzle (3) for injecting fuel and supplementary fluid into a combustion chamber of an internal combustion engine, having a nozzle body (3.0) with at least one inlet bore (3.2) for delivery of fuel at high pressure into the dual-substance nozzle (3), and nozzle bores (3.8) for injecting fuel from the dual-substance nozzle into the combustion chamber. A jacket (7), preferably metal, is disposed around the nozzle body (3.0) enclosing at least one hollow chamber (8), adjoining the outside of the nozzle body (3.0) and extending around the nozzle body (3.0) for receiving supplementary fluid. A feed line (5) for delivering supplementary fluid at high pressure into the hollow chamber and one or more injection nozzles for injecting supplementary fluid from the hollow chamber into the combustion chamber are provided. The injection of fuel and supplementary fluid are separate, insuring no mixing thereof upstream of the combustion chamber.

24 Claims, 4 Drawing Sheets

DUAL NOZZLE FOR INJECTING FUEL AND AN ADDITIONAL FLUID

SPECIFICATION

PRIOR ART

The invention is based on a dual-substance nozzle for an internal combustion engine.

One such dual-substance nozzle is known for instance from German patent disclosure DE 39 28 611 A1.

Dual-substance nozzles serve to provide laminated injection of fuel and a supplementary fluid, such as Diesel fuel and water, into the combustion chamber of an internal combustion engine so as to reduce pollutant emissions from the engine and optionally to increase its efficiency.

A disadvantage of such known dual-substance nozzles is the possible mixing of fuelless supplementary fluid, or as a rule of Diesel with water, which is possible in the structural tracts upstream and downstream of the injection nozzles. For instance, the two components can mix together as a result of reflux of the supplementary fluid into the tank by way of leaks, and so forth.

Another disadvantage of the known dual-substance nozzles is that the injection can in principal occur only in laminar fashion; that is, fuel and supplementary fluid cannot be injected parallel, for instance.

From German patent DE 43 37 048 C2, an injection system with a dual-substance nozzle is also known that realizes what is known as the common rail technique, in which all the injection nozzles serving the engine are charged with fuel at high pressure from a common rail pressure reservoir.

Since for the injection event for the known dual-substance nozzle the entire injection volume, that is, fundamentally the fuel quantity and the supplementary fluid quantity (which for instance is one-third the fuel quantity), must be injected by means of the common rail pressure, and of that again approximately one-third is replaced by supplementary fluid by means of low pressure; that is, the high pressure attained for this one-third is nullified; the disadvantageous result is a fuel pumping output that is at least one-third higher than in normal fuel injection.

It is also disadvantageous in the known fuel injection system that one complicated and relatively expensive 3/2-way valve is needed for each individual injector for metering the quantity of supplementary fluid, as well as one further 3/2-way valve for controlling the Diesel injection quantity. For prestorage of the supplementary fluid, the fuel delivery from the common rail pressure reservoir to the injection nozzle is disrupted using the first 3/2-way valve and at the same time a pressure chamber surrounding the injection nozzle and in which fuel at high pressure is stored is drained off to the low-pressure fuel side by means of a suitable position of the first 3/2-way valve. By means of the resultant pressure drop in the pressure chamber, supplementary fluid is fed via a suitable line into the pressure chamber and positively displaces the equivalent volume of fuel. Next, the first 3/2-way valve is returned to a position that establishes a communication between the common rail pressure reservoir and the pressure chamber in the injection valve. For quantitatively precise metering of the fuel quantity to be injected and that is intended to follow the prestored supplementary fluid in the injection surge caused by the next valve opening, the further 3/2-way magnet valve is provided, which selectively connects the back end of the nozzle needle, which is held in the closing position by a spring, selectively with either the common rail pressure reservoir or the low-pressure fuel side and as a result chronologically controls the valve needle stroke, the opening and closing of the valve, and thus the desired injection quantity.

In principle, the known fuel injection system for each individual injector requires the two precise and thus complicated 3/2-way control magnet valves, so that both the desired fuel quantity and the required quantity of supplementary fluid can be metered exactly.

ADVANTAGES OF THE INVENTION

The dual-substance nozzle, for the sake of strict separation of fuel injection from supplementary fluid injection will be set fourth hereinafter. Any mixing of fuel with supplementary fluid before the actual injection is thus precluded. The two fluids can at most meet one another in the combustion chamber of the internal combustion engine equipped with the dual-substance nozzle of the invention.

An advantage of using the dual-substance nozzle of the invention is also that at arbitrary times, supplementary fluid can be added to the fuel injection stream or injected for other cooling purposes. For instance if water and Diesel are injected at parallel times in Diesel engines, then the total injection time is shortened, which in terms of $NO_x$ production leads to considerably more favorable results during combustion.

The actual Diesel injection nozzle ports can be kept smaller, which is advantageous for the combustion behavior at low load.

Another considerable advantage of the dual-substance nozzle of the invention is that because the supplementary fluid is carried on the outside, cooling annularly around the injector takes place, which precisely in the full-load phase, in which large quantities of high-pressure fuel must be injected, causing heating of the injector, represents a substantial improvement.

A fuel injection system for an internal combustion engine which is equipped with a dual-substance nozzle of the invention is also within the scope of the invention. Especially if the fuel injection system makes use of the above-described, known common rail technique for fuel injection, the two complicated and expensive 3/2-way magnet control valves can be replaced by a single, simpler and less expensive 2/2-way valve in the fuel injection line between the common rail pressure reservoir and the fuel inlet bore in the nozzle body; by suitable timing control, this valve performs the quantity metering for the fuel quantity to be injected.

The lost one-third of power mentioned above in the injection event with internal storage of the supplementary fluid can be reduced to only a few percent if the dual-substance nozzle of the invention is used, because of the deposit of the supplementary fluid on the outside; this is true even if a pressure of 100 bar or more must be brought to bear by the supplementary fluid supply.

An embodiment of the dual-substance nozzle invention that is especially preferred is one in which the jacket, which closes off the hollow chamber, intended for receiving supplementary fluid, on the outside is welded in an annularly sealing fashion on its upper end to the nozzle body and on its lower end rests raisably on the nozzle body with a defined pressure and thus forms a sealing joint which presses against a lip-like sealing seat on the nozzle body and is capable of opening in order to inject supplementary fluid into the combustion chamber as soon as the supplementary fluid in the interior of the hollow chamber exceeds a certain differential pressure from the ambient pressure. The injection nozzles for the supplementary fluid can in particular be embodied by bores in the sealing joint downstream of the contact region with the sealing seat.

Another particular advantage of the dual-substance nozzle of the invention is the possibility of structural variation of the injection angle β of the supplementary fluid relative to the longitudinal axis of the nozzle body and thus also relative to the injection direction of the fuel into the combustion chamber. According to the invention, by a correct setting of the angle β, the dual-substance nozzle can be operated in such a way that the injected supplementary fluid in the combustion chamber strikes simultaneously injected fuel and by its impetus brings about a deflection of the fuel particles away from the wall of the combustion chamber, so that cooling down of the combustion chamber wall by as yet unignited fuel striking it is prevented.

The sealing joint in the above-described embodiment of the dual-substance nozzle of the invention is also intended to seal off the hollow chamber with the supplementary fluid in fluid-tight fashion even after a very high number of injection events, by resilient contact with and support on the sealing lip of the nozzle body. It is therefore advantageous for the jacket in the region of the sealing joint to be embodied as slightly crowned, so that its surface more or less rolls along this region. In the combustion process in the combustion chamber, the metal jacket is pressed against the injector body by the combustion pressure, and as a result, the region of the sealing joint is sealed off intensively. To avert inward deformation of the metal jacket, it is possible in especially preferred embodiments of the dual-substance nozzle of the invention for ribs, on which the metal jacket can be supported, and which extend parallel to the longitudinal axis of the nozzle body, to protrude radially away from the nozzle body in the region on the outside of the nozzle body covered by the jacket.

Further advantages and advantageous features of the subject of the invention will become apparent from the specification, drawing and claims.

DESCRIPTION OF THE DRAWINGS

Exemplary embodiments of the dual-substance nozzle of the invention, and its use in a fuel injection system for internal combustion engines, are shown in the drawings and will be described in the ensuing description.

Shown are.

DESCRIPTION OF THE EXEMPLARY EMBODIMENTS

Figure 1A:
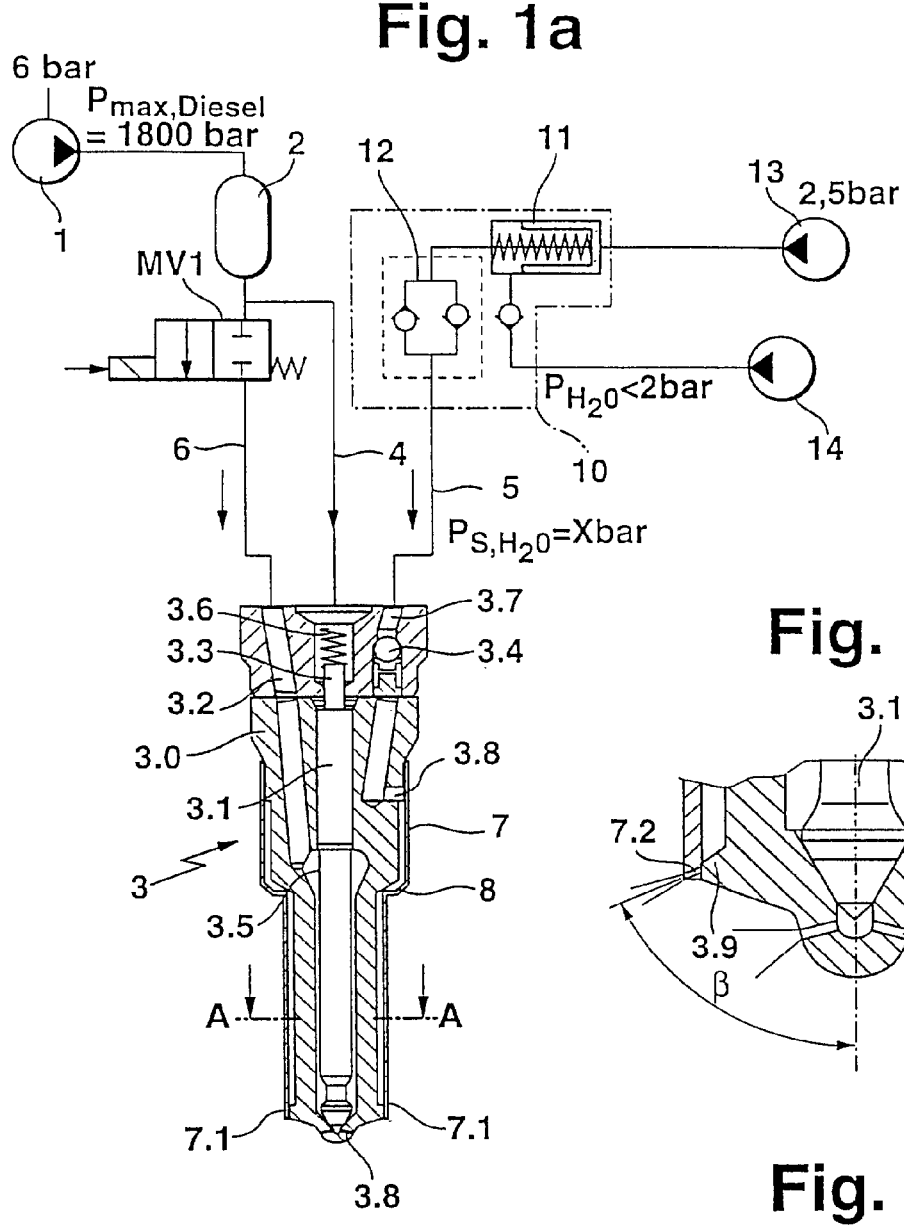
FIG. 1a illustrates a longitudinal section through a dual-substance nozzle of the invention with charging of the supplementary fluid by means of a divider piston adapter.

In the first exemplary embodiment, shown in FIG. 1a, of the dual-substance nozzle 3 of the invention in a fuel injection system for an internal combustion engine for dual-fluid injection of fuel (as a rule, Diesel fuel) and a supplementary fluid (as a rule, water), a high-pressure pump 1 supplies a common rail pressure reservoir 2 with fuel at a pressure level of approximately 1800 bar. Between the common rail pressure reservoir 2 and a pressure chamber 3.5, which surrounds the nozzle needle 3.1 of a dual-substance nozzle 3 and is to be supplied with fuel from the common rail pressure reservoir via an injection line, a quantity metering component must now be disposed, since after all, the classical injection pump that was typical earlier has been replaced by the combination of a common rail pressure reservoir 2 and the simpler high-pressure pump 1, and the rail pressure is always available at a certain level. This task is taken over, in the arrangement of the invention, by a first 2/2-way valve MV1. This valve should be designed as a high-speed magnet valve with good replicability and a more or less fluid transition between its two extreme positions, since a chronologically configurable course of injection quantity may possibly be needed. The precise quantity metering is made possible by way of the known (measured or controlled) pressure drop between the common rail pressure reservoir 2 and the engine combustion chamber to be supplied by the dual-substance nozzle 3, by means of a precise time slot, whose size depends on other factors, by way of an electrical triggering means that is not shown in the drawing.

In the nozzle needle 3 of the invention, however, a small piston 3.3 can be provided on the axial butt end, remote from the tip, of the nozzle needle (injector tappet) 3.1; this piston protrudes with its end remote from the nozzle needle 3.1 into a chamber 3.6, which via a line 4 communicates directly with the common rail pressure reservoir 2 and is acted upon by the high pressure prevailing there. As a result, in order to move the injector tappet 3.1, essentially the same resistance force must always be overcome, since now because of the constant piston area ratios and the preclusion of the influence of the absolute pressure in the common rail pressure reservoir 2, only a constant spring pressure needs to be overcome by a pressure pulse from the (variable) rail pressure. As a result, virtually constant switching times (motion time of the injector tappet) ensue, which are much more convenient from the standpoint of control technology.

For introducing supplementary fluid into the dual-substance nozzle 3, a feed line 5 is provided, which on one end discharges into an inlet bore 3.7 in the dual-substance nozzle 3. A check valve 3.4 may be disposed in the inlet bore 3.7; in the event that leaks occur in the lower region of the delivery system for supplementary fluid, this check valve is maintained for reasons of redundance, in order to prevent a backlash of the combustion pressure on components that are connected to the feed line 5 for supplementary fluid. Also by means of the check valve 3.4, the supplementary fluid in the downstream region remains at a higher initial tension, which is favorable for the injection dynamics.

On its other end, the inlet bore 3.7 discharges into an encompassing groove 3.8 in the nozzle body 3.0, which forms an annular conduit that enables access of the supplementary fluid to one or more hollow chambers 8 that are formed between the outside of the nozzle body 3.0 and a metal jacket 7 sealingly surrounding the outside of the nozzle body. The supplementary fluid can flow on the outside of the nozzle body 3.0 through the hollow chamber or chambers 8 to one or more injection nozzle openings, which are disposed in the lower region of the dual-substance nozzle 3, above the nozzle bores 3.8 for injecting the fuel into the engine combustion chamber.

In the exemplary embodiment shown in FIG. 1*a*, the jacket 7 is welded on its upper end annularly sealingly to the nozzle body 3.0, while on its lower end it rests with a defined pressure on the nozzle body 3.0 in raisable but sealing fashion and thus forms a sealing joint 7.1, which will be explained in further detail in conjunction with FIGS. 2*a* through 2*d*.

Figure 1B:
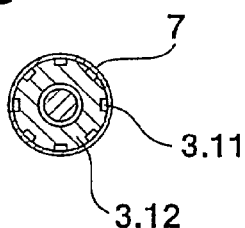
FIG. 1b illustrates a cross section of FIG. 1a in the plane A—A.

In FIG. 1*b*, the dual-substance nozzle 3 of FIG. 1*a* is shown in cross section along the line A—A. In this embodiment, grooves 3.11 for carrying the flowing supplementary fluid, which extend parallel to the longitudinal axis of the nozzle body 3.0, are mounted on the outside of the nozzle body 3.0, in the region covered by the jacket 7; they form the hollow chambers 8 in this exemplary embodiment. Between the grooves 3.11, ribs 3.12 protrude radially away from the nozzle body 3.0, and upon pressure from outside, especially in response to the combustion pressure in the combustion chamber, the jacket 7 can be braced on the ribs, thus preventing inward deformation.

Figure 2B:
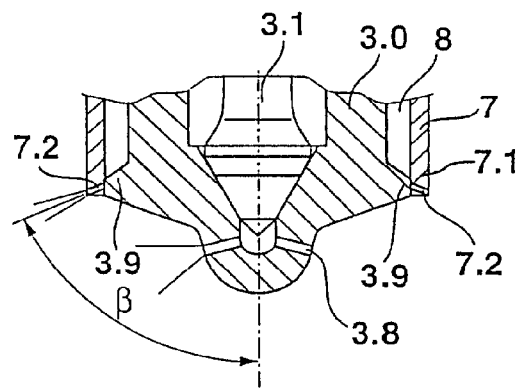
FIG. 2b, like 2a illustrates but with nozzle ports in the jacket and an oblique ejection characteristic of the supplementary fluid.
Figure 2A:
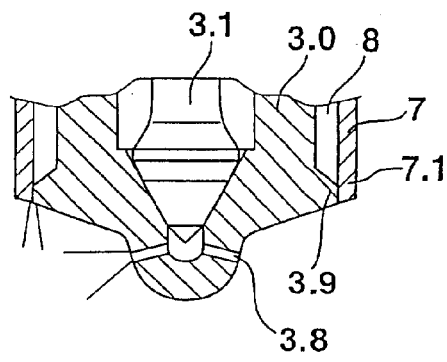
FIG. 2a illustrates a schematic longitudinal section through the lower portion of an embodiment of the dual-substance nozzle of the invention with a sealing joint of simple design and an ejection characteristic of the supplementary fluid approximately parallel to the longitudinal axis of the nozzle body.

FIG. 2*a* in a detail shows the region around the sealing joint 7.1. The sealing joint rests sealingly on a lip-like sealing seat 3.9 on the nozzle body 3.0, above the nozzle bores 3.8. If a certain differential pressure between the supplementary fluid in the hollow chamber 8 and the surroundings in the region of the sealing joint 7.1 is exceeded, the elastic metal jacket 7 lifts from the sealing seat 3.9 and thus opens up a flow cross section for the passage of supplementary fluid into the combustion chamber; this cross section has the effect of an injection nozzle. Once the hollow chambers 8 formed by grooves 3.11 extend directly via the nozzle bores 3.8 for the injection of fuel, the supplementary fluid, which will preferably take the most convenient course, will form an annular stream, possibly fanned out somewhat, about the longitudinal axis of the nozzle body 3.0; in the example shown, this stream is oriented approximately from top to bottom, parallel to the longitudinal axis of the nozzle body 3.0.

FIG. 2*b* shows an exemplary embodiment in which the stream of supplementary fluid enters the combustion chamber at an angle β from the longitudinal axis of the nozzle body 3.0. This can be attained by a suitable choice of the geometry in the region of the sealing joint 7.1, and in particular by means of obliquely extending nozzle bores 7.2 in the metal jacket 7. In the contacting state of the sealing joint 7.1, the nozzle bores 7.2 contact the sealing seat 3.9 of the nozzle body 3.0, so that the hollow chamber 8 is sealed off from the combustion chamber.

By varying the water injection angle β, particular possibilities for adapting the course of combustion and reducing pollutant emissions from the engine are obtained. If the injected supplementary fluid is aimed in such a way that it meets the injected fuel before the onset of combustion, then the fuel can be deflected, for instance in a curve, by a suitable transfer of impetus and thus can better fill the combustion chamber and be kept from striking the wall of the combustion chamber, so that as a result cooling of the wall of the combustion chamber is averted.

Figure 2C:
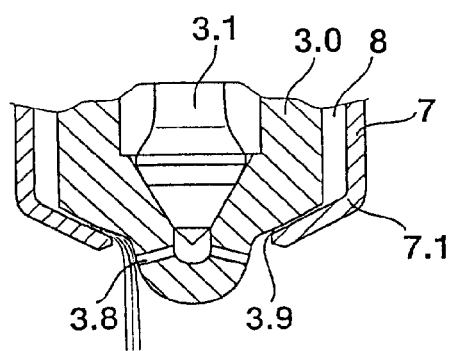
FIG. 2c, like FIG. 2a illustrates but with a jacket conically contacting the nozzle body.

Another simple embodiment for the design of the injection region in the area around the sealing joint 7.1 is shown in FIG. 2*c*.

Here, the sealing seat 3.9 is formed by a simple shoulder milled into the nozzle body 3.0. In contrast to the exemplary embodiments of FIGS. 2*a* and 2*b*, where the jacket 7 in its lower region cylindrically and radially encloses the nozzle body 3.0 from the underside, here in the embodiment of FIG. 2*c* it embraces it conically from below.

Because of this conical embodiment of the jacket 7, the supplementary fluid upon injection can sweep around the nozzle dome of the nozzle body 3.0 and as a result can be placed immediately above the fuel injection stream after the latter emerges from the nozzle bores 3.8. The addition of supplementary fluid can be superimposed on the injection of fuel or made to precede it or follow it in entirely free timing cycles. A desired side effect of the stream guidance of the supplementary fluid in the exemplary embodiment of FIG. 2*c* is a cooling of the nozzle dome, which can help prevent possible carbonization of the nozzle bores 3.8 or at least delay it.

During the combustion of the fuel in the combustion chamber, the metal jacket 7 in the region of the sealing joint 7.1, because of its conical shape and the larger surface area of attack, is pressed even more intimately against the sealing seat 3.9 of the nozzle body 3.0 as a result of the pressure generated by the combustion process, and an invasion of hot combustion gases into hollow chambers 8 is prevented thereby.

Figure 2D:
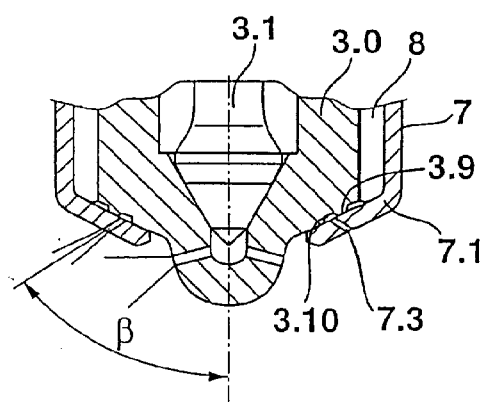
FIG. 2d, like FIG. 2c illustrates but with nozzle bores for the supplementary fluid, an ejection characteristic extending obliquely downward, and an annular chamber in the nozzle body in the region of the nozzle bores.

A further exemplary embodiment for the design of the injection nozzle region for supplementary fluid is shown in FIG. 2*d*. There again, the metal jacket 7 is embodied conically in the region of the sealing joint 7.1. The liplike sealing seat 3.9 is followed here by an encompassing annular groove 3.10 in the nozzle body 3.0, and this groove is adjoined directly by obliquely extending bores 7.3 in the sealing joint 7.1. When supplementary fluid under pressure is introduced from the hollow chambers 8, the metal jacket 7 is lengthened and longitudinally inflated by expansion, in accordance with Hooke's law, in the region of the sealing joint 7.1. A longitudinal and angular motion of the metal jacket cone in the region of the sealing seat 3.9 that follows this expansion leads to an opening, through which supplementary fluid can flow into the annular conduit formed by the encompassing annular groove 3.10, and be injected via the bores 7.3 into the combustion chamber at an injection angle β.

The metal jacket 7 is fitted onto the nozzle body 3.0 for assembly and welded in its upper region to the nozzle body. The lower part of the metal jacket, which in the exemplary embodiments of FIGS. 2*c* and 2*d* extends conically inward, first receives its final angular form as a result of this pressfitting and welding; if possible, it should be somewhat prestressed before the welding. In the state in which it is shipped, the jacket 7 initially has a more truncated cone, and when that is threaded in the press-fitting process, the sealing joint 7.1 is formed in the region of the sealing seat 3.9. As a result, supplementary fluid from the hollow chambers 8 can reach the combustion chamber only whenever the sealing joint 7.1 lifts away from the sealing seat 3.9, in response to a pressure surge in the supplementary fluid in the hollow chambers 8.

Before the actual injection event for the supplementary fluid, the correct quantity of supplementary fluid must be metered and fed into the dual-substance nozzle 3 while the system pressure is still low. In the exemplary embodiment of FIG. 1a, this is accomplished by means of a so-called M pump 13, which pumps an operating fluid at a pilot pressure of approximately 2.5 bar into a divider piston adapter 10 that has a divider piston 11 and an equal-pressure valve 12. The divider piston adapter 10 separates the operating fluid (as a rule, Diesel fuel) of the M pump 13 from the supplementary fluid (as a rule, water) to be introduced. In the process, the water side of a cylinder liner in the divider piston 11 is charged with supplementary fluid at low pressure (small p<2 bar) by a fill pump 14 via a check valve 16. At the correct time before the actual injection, that is, between the injection cycles, a desired quantity of operating fluid is dispensed by the M pump 13 to the divider piston 11 at a higher pressure than that for which the check valve 3.4 of the dual-substance nozzle 3 is set. As a result, the quantity of supplementary fluid, of which on the other side of the divider piston 11 corresponds to the quantity of operating fluid of the M pump 13, is sent onward via the equal-pressure valve 12 to the feed line 5. The equal-pressure valve 12 serves to relieve the pressure or supply the correct pilot pressure to the feed line 5 between the divider piston adapter 11 and the dual-substance nozzle 3.

Figure 3:
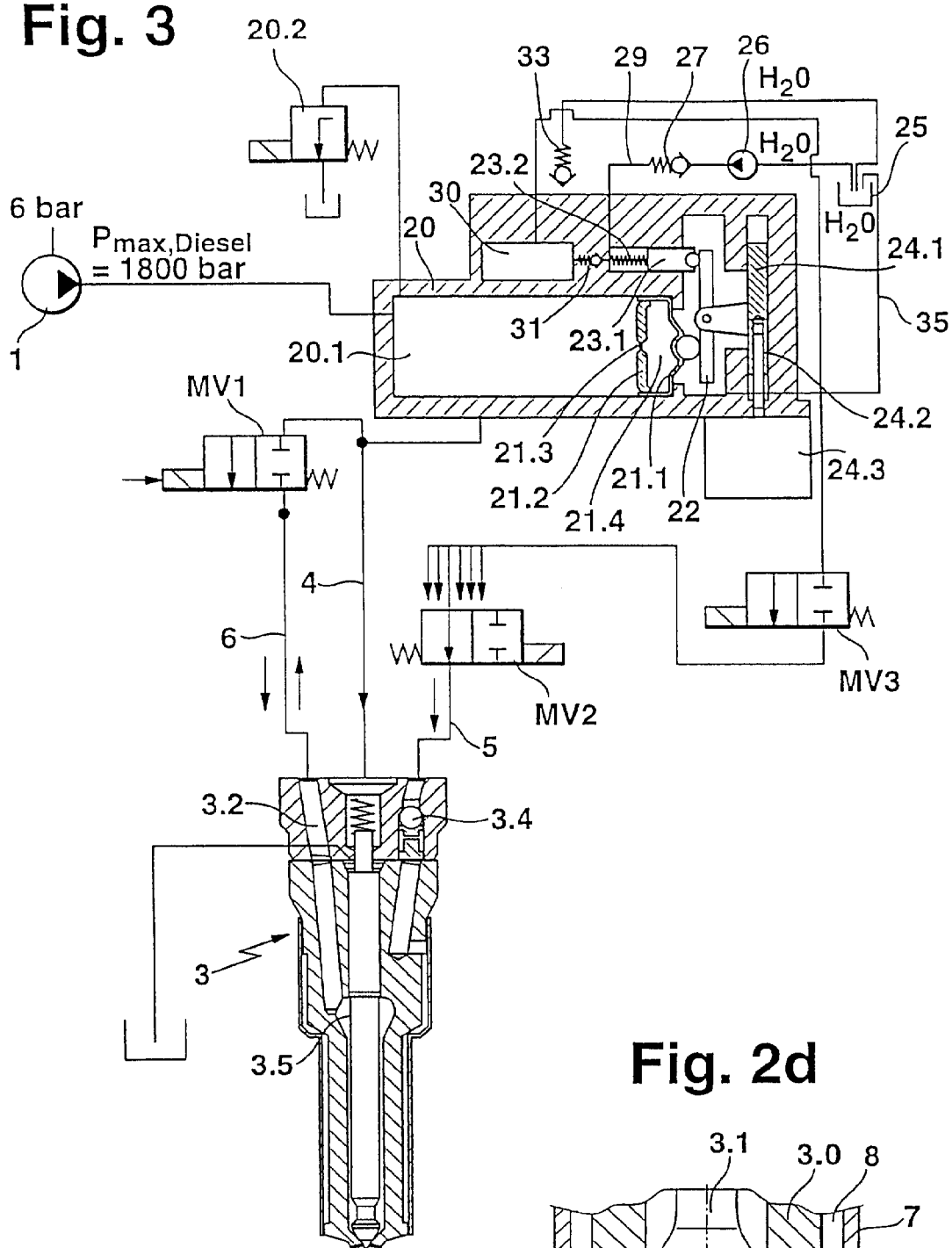
FIG. 3 illustrates a further exemplary embodiment of a fuel injection system with a dual-substance nozzle according to the invention and with one common rail pressure reservoir for the fuel and an additional common rail pressure reservoir for the supplementary fluid.

The further exemplary embodiment of the fuel injection system of the invention, shown in FIG. 3, differs from that shown in FIG. 1a in a modification of the part of the system that is responsible for feeding the supplementary fluid. In order to replace the expensive M pump 13 of FIG. 1a with less expensive equipment, a pump for the supplementary fluid is now coupled with the common rail pressure reservoir 20. To that end, a diaphragm 21.1 is pivotably connected by means of a solid wall 21.2 to one end of the common rail pressure reservoir 20; the solid wall 21.2, by having a slightly conical outer contour, fastens the diaphragm 21.1 in pressure-tight fashion in a high-pressure chamber 20.1 of the common rail pressure reservoir 20. A variable-aperture bore 21.3 is provided in the solid wall 21.2; through it, fuel from the high-pressure chamber 20.1 can, depending on the direction of the pressure drop, enter into or emerge from a chamber 21.4 which is enclosed by the diaphragm 21.1 and the solid wall 21.2.

A lever mechanism 22 is connected on one end to the side of the diaphragm 21.1 remote from the chamber 21.4 and on the other side to a pump piston 23.1. The lever mechanism is also rotatably supported on a longitudinally movably guided slide 24.1. Pressure fluctuations in the high-pressure chamber 20.1 caused by an abrupt withdrawal of the injection quantity of fuel produce a motion of the diaphragm 21.1. The diaphragm travel causes a reciprocating motion of the lever mechanism 22, which in turn causes a corresponding stroke of the pump piston 23.1. The pump piston 23.1 is prestressed accordingly via a compression spring 23.2, so that no "backlash" whatever can occur in any phase of motion.

During the intake phase, the pump piston 23.1, via a line 29 with a check valve 27, and reinforced by a prefeed pump 26, aspirates a suitable quantity of supplementary fluid from a tank 25. Upon expulsion, the quantity of water is thrust into the dual-substance nozzle 3 via the feed line 5 and the check valve 3.4, in the event that a second 2/2-way valve MV2 for directing the water quantity has been opened by a command of an engine management system not shown in the drawing.

To allow the desired quantity of supplementary fluid to be metered correctly, the slide 24.1 is moved up or down in accordance with a rotation command of an engine management system by an electric motor 24.3, which has a spindle 24.2 screwed into the slide 24.1. This adjusts the lever ratio of the lever assembly 22, so that different stroke volumes of the pump piston 23.1 can be established. In this way, either from one injection even to another the pump device can meter different quantities of supplementary fluid into the same injector 3, or additional injectors (suggested in the drawing by a number of parallel arrows) connected to the feed line 15 can be charged individually with whatever is the correct quantity of supplementary fluid for each of them at that time.

The fuel pressure in the high-pressure chamber 20.1, which is variable with a pressure control valve 20.2, also influences the motion control of the slide 24.1, by way of a drifting away of the diaphragm. If fairly accurate quantitative metering of the supplementary fluid to be injected is to be possible, either the pressure fluctuations in the high-pressure chamber 20.1 should be measured and calculated with the diaphragm code by the engine management system. The latter can then issue the appropriate rotation command to the electric motor 24.3, and a positional detection of the spindle 24.2 is also helpful.

Alternatively, the instantaneous stroke of the pump piston 23.1 can be measured and compared with other important instantaneously present data as well as the current desired change and calculated, so that as fast as possible, an adaptation can be made to new conditions (such as a change in the position of the accelerator pedal made by the driver of a motor vehicle).

Vibration reactions of the diaphragm 21.1 which are caused by pressure surges or other lesser pressure fluctuations with relatively high frequencies in the high-pressure chamber 20.1 and detract from precise metering of the requisite supplementary fluid, are damped by means of a suitable dimensioning and adaptation of the solid wall 21.2 with the aperture bore 21.3 and the spring behavior of the diaphragm 21.1. In dynamic cooperation of these three elements, a behavior is in fact established that comes close to a hydraulic low-pass filter; the solid wall 21.2 in an electrical analogy is equivalent to an inductive resistor, the aperture bore 21.3 to an ohmic resistor, and the diaphragm 21.1 to a capacitor. In this way, only major low-frequency pressure fluctuations that result from suitably major volumetric movements in the high-pressure chamber 20.1 can have effects on the diaphragm motions. This kind of hydraulic low-pass filter also has an advantageous effect on the pressure conditions in the high-pressure chamber 21.4 because as a result, damping of pressure fluctuations also takes place.

The embodiment shown in FIG. 3 also differs from the exemplary embodiment of FIG. 1a in that to supply water to the dual-substance nozzle 3, a further common rail pressure reservoir 30 for receiving supplementary fluid under pressure is provided; it is connected via a further 2/2-way valve MV3 to the feed line 5 leading to the dual-substance nozzle 3 and via a check valve 31 to the feed side of the diaphragm-driven pump piston 23.1.

A compact and space-saving overall arrangement is obtained if, as shown in FIG. 3, the further common rail pressure reservoir 30 for the supplementary fluid is joined integrally to the common rail pressure reservoir 20, which includes the high-pressure chamber 20.1 for the fuel.

The function of the quantitative metering of supplementary fluid in this embodiment is facilitated, among other factors, by the fact that it is separate from the function of feeding supplementary fluid. In this way, the quantitative metering can also be done more precisely.

To reduce costs (with higher mass-produced numbers) the further 2/2-way valve MV3 can be designed to be structurally identical to the first 2/2-way valve MV1; however, the 2/2-way valve MV3 must pass muster for operation with the supplementary fluid. Furthermore, the further 2/2-way valve MV3 can supply an entire group of dual-substance nozzles 3 as long as there are no chronological overlaps in the metering events for the various injectors. Once again, a second 2/2-way valve MV2 of simple design decides which injector the quantity of supplementary fluid metered should be directed to at a given time, but this valve must then be present for each dual-substance nozzle in the group.

To keep the pressure drop, which is usable for control purposes, between the further common rail pressure reservoir 30 with supplementary fluid and the remainder of the hydraulic resistance chain constant, the further common rail pressure reservoir 30 communicates with the supply container 25 for supplementary fluid via a pressure holding valve 33 ($p_0$=const). To divert any possible leakage of supplementary fluid from the chamber enclosing the lever mechanism 22, a leakage line 35 is provided and discharges into the supply container 25.

Figure 4A:
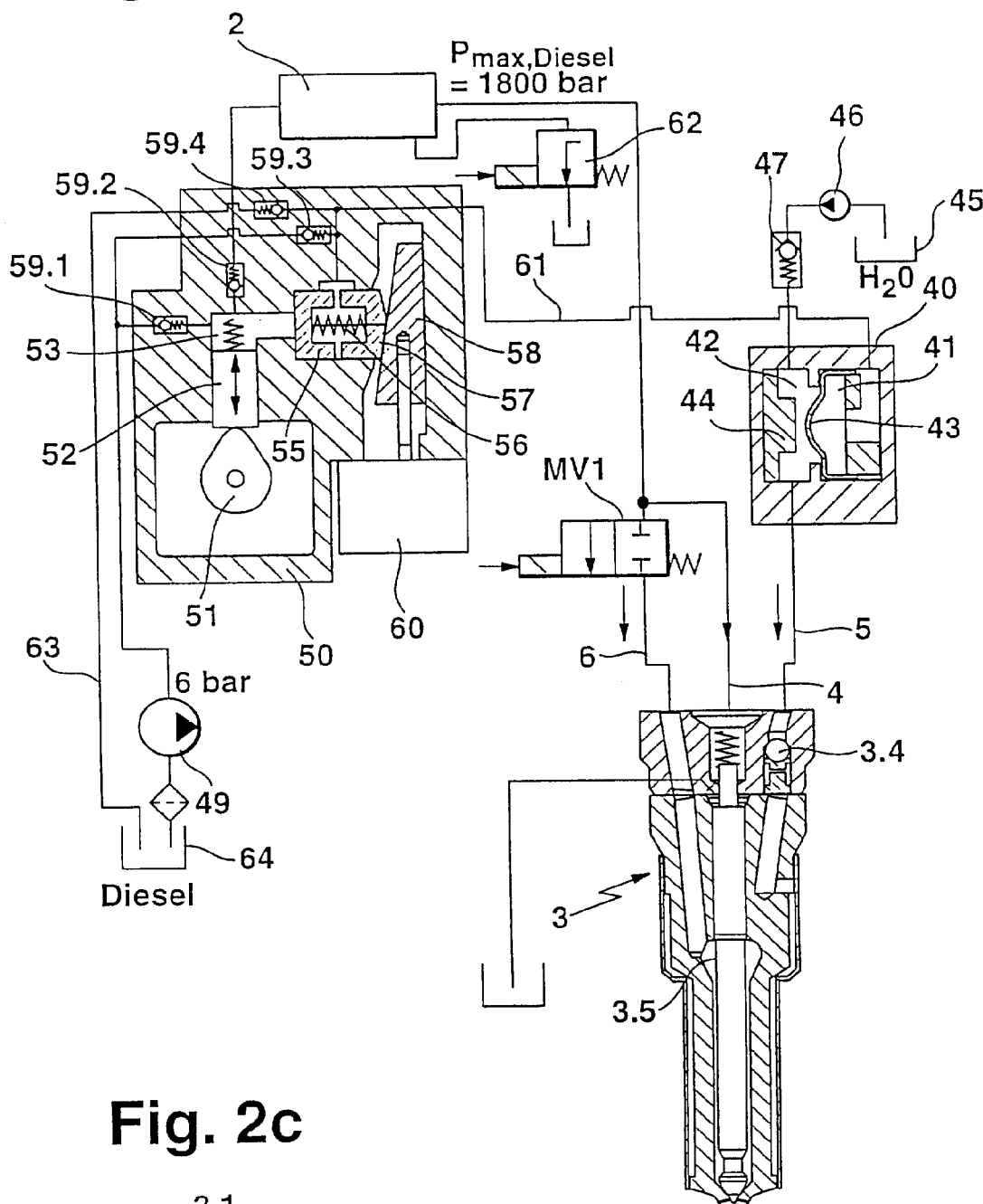
FIG. 4a illustrates a third exemplary embodiment of a fuel injection system with a dual-substance nozzle of the invention and charging thereof with supplementary fluid by way of a diaphragm adapter.

The further exemplary embodiment, shown in FIG. 4*a*, of the fuel injection system of the invention differs from the embodiment shown in FIG. 1*a* on the one hand in having a high-pressure pump unit 50 which not only charges the common rail pressure reservoir 2 but also takes on the task of volumetric metering for supplementary fluid, and on the other in having a modification of the divider piston unit in the form of a diaphragm adapter 40, which now has a diaphragm 43 instead of a conventional divider piston.

The high-pressure pump unit 50 is charged by a fuel pump 49, which draws fuel from a fuel tank 64 and pumps it, at a pressure level of about 6 bar, via a check valve 59.1 into a compression chamber 54 of the high-pressure pump unit 50. A plurality of preferably in-line high-pressure pistons 52, driven by a camshaft 51 and each pressed back against the cam of the camshaft 51 by compression springs 53, during their respective stroke each effect a compression of the fuel in the pressure chamber 54. As a result, when a defined threshold pressure is exceeded, an outlet valve 59.2 integrated with the high-pressure pump unit 50 is opened, and fuel is pumped at a pressure level of about 1800 bar into the common rail pressure reservoir 2, whose internal pressure is kept constant, or is regulated to the desired level, via a pressure regulating valve 62.

In order now to be able, via a hydraulic line 61, to charge the diaphragm adapter 40 with a desired volume for a particular dual-substance nozzle 3, which volume is dispensed as a supplementary fluid volume, via the feed line 5, the following arrangement is provided in the high-pressure pump unit 50: Laterally of the compression chamber 54, outside the range of reciprocation of the high-pressure pistons 52, a longitudinally movable, gap-sealed first piston 55 is disposed, which is braced apart from a second piston 57 by means of a compression spring 56. The second piston 57, on its backside face remote from the first piston 55, has a rounded or beveled tip on which a longitudinally displaceable dimensioning wedge 58 rests in force-locking fashion.

By suitable displacement of the dimensioning wedge 58, the relative axial position of the second piston 57 with respect to the first piston 55 can therefore be-varied. The drive of the dimensioning wedge 58 is effected via a spindle, which is driven by an electric motor 60 and engages a suitable thread in the dimensioning wedge 58 and displaces this wedge in its longitudinal direction upon rotation of the electric motor 60.

If one of the high-pressure pistons 52 now executes a compression stroke and subjects the fuel in the compression chamber 54 to pressure, the first piston 55 is displaced, counter to the force of the compression spring 56, in the direction of the second piston 57 which is longitudinally arrested at the backside by the dimensioning wedge 58. Given suitable dimensioning of the spring characteristics of the compression spring 56, the first piston 55 can in turn, during the high-pressure compression process by the corresponding high-pressure piston 52, perform expulsion work until such time as it strikes the second piston 57. As a result, a precisely defined fuel volume is sent onward, out of the chamber between the two pistons 55 and 57 that contains the compression spring 56, to the divider piston unit 40 via the hydraulic line 61. During an intake stroke, when the compression chamber 54 is increased in volume, the first piston 55 moves axially away from the second piston 57 again because of the force of the compression spring 56, and fuel can be dispensed by the fill pump 49 into the chamber between the two pistons 55 and 57 via an inlet check valve 59.3.

The volume of fuel sent on to the divider piston unit 40 by the high-pressure pump unit 50 via the hydraulic line 61 enters a first inner chamber 41 of the divider piston unit 40; this chamber is partitioned off in sealing fashion from a further inner chamber 42, which contains supplementary fluid, by means of the diaphragm 43 fastened in pressure proof fashion. Depending on the particular volumetric surge of fuel pumped, the diaphragm 43 expands, with precisely the same volumetric positive displacement, into the inner chamber 42, and as a result the appropriate quantity of supplementary fluid is transported onward via the feed line 5 to the dual-substance nozzle.

If the geodetic gradient for pumping the supplementary fluid fails to be attained, then the supplementary fluid is pumped by a fuel pump 46 out of a supplementary fluid container 45 via a check valve 47 into the inner chamber 42 of the divider piston unit 40.

Since the pressure for injecting supplementary fluid is substantially lower (approximately 20 to 30 bar, or during combustion<200 bar) than the lowest pressure in the common rail pressure reservoir 2 (approximately 500 bar), mobility of the first piston 55 for the indirect metering of supplementary fluid during the compression phase of the high-pressure pistons 42 will be readily possible. The defined quantity of fuel for the quantitative metering of supplementary fluid is specified fairly precisely by the position, and the thus-presented stop of the pistons 55 and 57, of the dimensioning wedge 58, which in turn can be adjusted by the threaded spindle of the electric motor 60. The electric motor 60 receives its control command from an engine management system, not shown in the drawing.

If a defined, temporarily unchanged control position of the dimensioning wedge 58 is made a precondition, and if the first piston 55 is made to perform its expulsion work and its intake events, then something like a closed hydraulic system exists in cooperation with the yielding diaphragm 43 of the divider piston unit 40 in the chambers designated as the "diaphragm-Diesel side", "line 61" and in the "compression chamber of the pistons 55 and 57"; in other words, at all times it is only fuel that is shifted back and forth. The system is replenished by the fill pump 49 only whenever intake defects may occur, for instance from leakage from the pistons 55 and 57. If the dimensioning wedge 58 is now pulled downward, that is, in the direction of greater volumetric surges, then an intake defect again exists. The first piston 55 receives the missing amount from the fuel pump 49. The intended consequence is that the diaphragm 43 is naturally deflected farther per stroke than before.

In the "closed hydraulic system", however, there is now more volume available than in the previous position of the dimensioning wedge 58. If in the context of power adaptation, which takes precedence, the dimensioning wedge 58 is moved backward again by a considerable distance, then by that time there may be so much volume in the system that the diaphragm 43 no longer returns to its "zero position", yet still continues to perform its set strokes, but they are now shorter. In other words, some diaphragm drift is now present. If there is frequent adjustment, as will often be the case, this drift can be so extensive that there is a risk of an overload of the diaphragm 43. To prevent this in such cases, the diaphragm 43 should strike against a stop 44 in the inner chamber 42.

An overpressure will briefly build up in the system, and the volume that causes it is diverted to the fuel tank 64 via an outlet check valve 59.4, which is preferably integrated with the high-pressure pump unit 50, and via a relief line. This result is merely a brief miscontrol of water quantity (too little may be injected—not a total failure!), which will hardly have any dramatic effect in terms of the avoidance of nitrogen oxide during the many other properly regulated combustion events.

If an injection is not needed, then furthermore by means of the electric motor 60, or the dimensioning wedge 58 moved by it, the supplementary fluid quantity can be reduced to zero. The pistons 55 and 57 are then simply pressed together more or less, so that the first piston 55 can no longer execute any working stroke.

To assure proper, unimpeded operation of the a plurality of dual-substance nozzle 3 with the appropriate quantity of supplementary fluid, it would seem necessary at first glance to install one high-pressure piston 53, with pistons 55 and 57 attached to it, and one divider piston unit 40, for each injector 3.

Figure 4B:
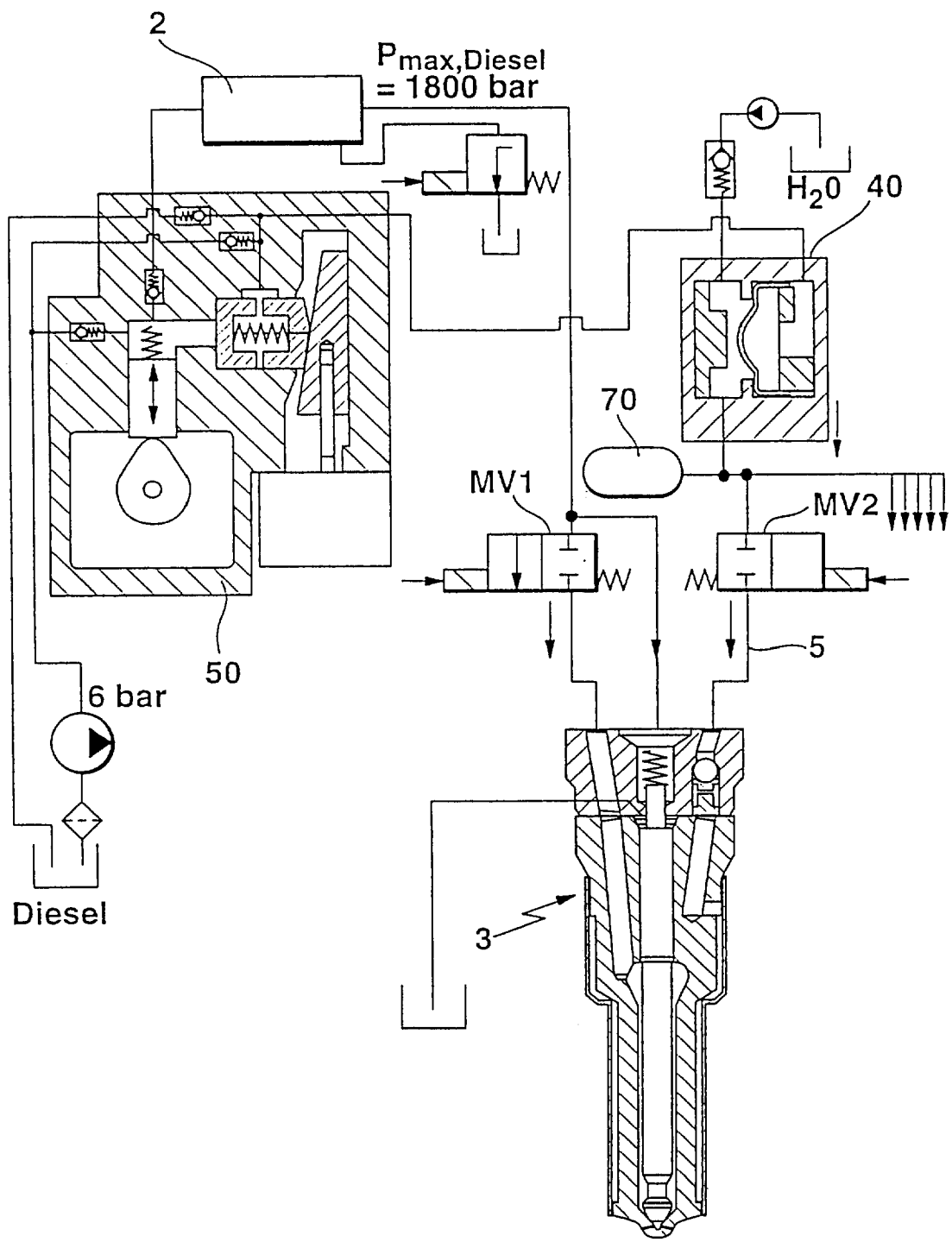
FIG. 4b, like FIG. 4a illustrates charging of a plurality of injectors jointly with supplementary fluid from a further common rail pressure reservoir.

For typical utility vehicle Diesel engines with many working cylinders, however, this would be very expensive and moreover would take up considerable installation space. Such costs and space requirements can be reduced by having entire groups of injectors or all the injectors supplied by only a few supply tracts for supplementary fluid. In FIG. 4b, many parallel-connected injectors are represented by parallel arrows.

If the layout is arranged this way, then care must be taken to prevent the pistons 55 from pumping in recirculation. That is, a piston 55 must be prevented from aspirating just while another piston 55 is sending an amount of fuel to the divider piston unit 40. This condition must be organized with regard to the course over time of the working strokes. In the planning process, the possible reduction in, or the absolutely required number of, high-pressure pistons 52 and their structural relationship for supplying the water quantity will arise out of the above considerations, as long as no other arguments, involving pressure pulsations in the common rail pressure reservoir, etc., stand in the way.

Costs can be reduced in a similar way if once again groups of pistons 55 and 57 can be operated by one dimensioning wedge and electric motor assembly.

Since the quantitative expulsion of fuel for the quantitative metering of supplementary fluid takes place during the high-compression phase of the high-pressure pistons 52 rather than at a possibly different correct injection instant for supplementary fluid, a second 2/2-way valve MV2 of the correct injector 3 must be switched at the proper time to inject supplementary fluid. If, as in the relatively simple system shown in FIG. 4a for the indirect metering of supplementary fluid, an injector is missing its own switch gear for injector triggering, then the precise injection instant for supplementary fluid must be adapted to the injection instant for fuel at full load by means of the most exact possible adjustment of the cam rotation angle of the high-pressure pump.

A further difference in the exemplary embodiment of FIG. 4b as compared with that of FIG. 4a is that a further common rail pressure reservoir 70 is provided, in which, by way of the divider piston unit 40, a certain quantity of supplementary fluid is stored and can pass into the dual-substance nozzle 3 for injection at an arbitrary time by suitable actuation of the 2/2-way valve MV2.

The foregoing relates to a preferred exemplary embodiment of the invention, it being understood that other variants and embodiments thereof are possible within the spirit and scope of the invention, the latter being defined by the appended claims.

What is claimed is:

1. A dual-substance nozzle (3) for injecting fuel and a supplementary fluid into a combustion chamber of an internal combustion engine, comprising a nozzle body (3.0) which has at least one inlet bore (3.2) for the delivery of fuel at high pressure into the dual-substance nozzle (3), and nozzle bores (3.8) for injecting the supplementary fluid from the dual-substance nozzle into the combustion chamber, a jacket (7) is disposed around the nozzle body (3.0) and encloses at least one hollow chamber (8), adjoining an outside of the nozzle body (3.0) and extending around the nozzle body (3.0) for receiving said supplementary fluid, and that a feed line (5) is provided for delivering said supplementary fluid at high pressure into the hollow chamber (8) and one or more injection nozzles are provided for injecting said supplementary fluid from the hollow chamber (8) into the combustion chamber, and the jacket (7), on an upper end, is annularly sealingly joined to the nozzle body (3.0), and on a lower end rests in raisable fashion with a defined pressure on the nozzle body (3.0).

2. The dual-substance nozzle according to claim 1, in which a lip-like sealing seat (3.9) is embodied on the nozzle body (3.0) in a region above the nozzle bores (3.8), and at the sealing seat, the jacket (7) rests sealingly with the lower end and forms a sealing joint (7.1), which if a certain differential pressure between the supplementary fluid in the hollow chamber (8) and the surroundings in the region of the sealing joint (7.1) is exceeded, the pressure lifts the jacket from the sealing seat (3.9) and thus opens up the flow cross section of one or more injection nozzles for injecting supplementary fluid into the combustion chamber.

3. The dual-substance nozzle according to claim 2, in which the injection nozzles for injecting supplementary fluid are embodied by bores (7.2; 7.3), which are mounted in the sealing joint (7.1) downstream, in terms of the flow direction of the supplementary fluid, of the region in which the sealing joint (7.1) rests on the sealing seat (3.9).

4. The dual-substance nozzle according to claim 3, in which an encompassing annular groove (3.10) is provided in the nozzle body (3.0) in the region of the bores (7.3).

5. The dual-substance nozzle according to claim 4, in which the angle β between the longitudinal axis of the nozzle body (3.0) and the flow direction of the supplementary fluid injected into the combustion chamber can be varied structurally by means of a suitable choice of a geometry of the jacket (7) on a lower, raisable end of the jacket (7) and of the nozzle body (3.0) in the lower contact region of the jacket (7), by a choice of the relative position between the bores (7.2; 7.3) for injecting the fuel and the injection nozzles (3.8) for injecting supplementary fluid.

6. The dual-substance nozzle according to claim 2, in which the angle β between the longitudinal axis of the nozzle body (3.0) and the flow direction of the supplementary fluid injected into the combustion chamber can be varied structurally by means of a suitable choice of a geometry of the jacket (7) on a lower, raisable end of the jacket (7) and of the nozzle body (3.0) in the lower contact region of the jacket (7), by a choice of the relative position between the bores (7.2; 7.3) for injecting the fuel and the injection nozzles (3.8) for injecting supplementary fluid.

7. The dual-substance nozzle according to claim 3, in which the angle β between the longitudinal axis of the nozzle body (3.0) and the flow direction of the supplementary fluid injected into the combustion chamber can be varied structurally by means of a suitable choice of a geometry of the jacket (7) on a lower, raisable end of the jacket (7) and of the nozzle body (3.0) in the lower contact region of the jacket (7), by a choice of the relative position between the bores (7.2; 7.3) for injecting the fuel and the injection nozzles (3.8) for injecting supplementary fluid.

8. The dual-substance nozzle according to claim 1, in which the angle β between the longitudinal axis of the nozzle body (3.0) and the flow direction of the supplementary fluid injected into the combustion chamber can be varied structurally by means of a suitable choice of a geometry of the jacket (7) on a lower, raisable end of the jacket (7) and of the nozzle body (3.0) in the lower contact region of the jacket (7), by a choice of the relative position between the bores (7.2; 7.3) for injecting the fuel and the injection nozzles (3.8) for injecting supplementary fluid.

9. A method for operating a dual-substance nozzle (3) according to claim 8, in which the angle β between the longitudinal axis of the nozzle body (3.0) and the flow direction of the supplementary fluid injected into the combustion chamber is adjusted such that the injected supplementary fluid in the combustion chamber meets the simultaneously injected fuel, and by an impetus of the supplementary fuel effects a deflection of at least some of the fuel particles away from the wall of the combustion chamber.

10. The dual-substance nozzle according to claim 1, in which the jacket (7) on its lower end conically embraces the nozzle body (3.0) from below.

11. The dual-substance nozzle according to claim 1, in which the jacket (7) on its lower end radially encloses the nozzle body (3.0) cylindrically.

12. The dual-substance nozzle according to claim 1, in which the jacket (7) is slightly crowned on its lower end in the region of the contact with the nozzle body (3.0).

13. The dual-substance nozzle according to claim 1, which includes (3.11) that extend parallel to the longitudinal axis of the nozzle body (3.0) which are mounted on the outside of the nozzle body (3.0), in the region covered by a jacket (7).

14. The dual-substance nozzle according to claim 1, which includes ribs (3.12) that extend parallel to the longitudinal axis of the nozzle body (3.0) which protrude radially away from the nozzle body on an outside of the nozzle body (3.0) in a region covered by the jacket (7).

15. The dual-substance nozzle according to claim 1, in which a region of the nozzle body (3.0) axially opposed to the nozzle bores (3.8) and inlet bore (3.7) for supplementary fluid is provided, and includes a feed line (5) for delivering supplementary fluid that discharges on one end.

16. The dual-substance nozzle according to claim 15, in which the inlet bore (3.7) for supplementary fluid discharges on an end into an annular conduit, formed by an encompassing groove in the nozzle body (3.0), which connects the inlet bore (3.7) for supplementary fluid with the hollow chamber or chambers (8).

17. The dual-substance nozzle according to claim 16, in which a check valve (3.4) is provided in the inlet bore (3.7) for supplementary fluid.

18. The dual-substance nozzle according to claim 15, in which a check valve (3.4) is provided in the inlet bore (3.7) for supplementary fluid.

19. A fuel injection system for an internal combustion engine, comprising a dual-substance nozzle (3) according to claim 1, in which a common rail pressure reservoir (2; 20), which can be filled with fuel at high pressure, communicates via an injection line (6), which can be opened or closed by a 2/2-way valve (MV1), with the inlet bore (3.2) for fuel in the nozzle body (3.0) of the dual-substance nozzle (3).

20. The fuel injection system according to claim 19, in which the feed line (5) for supplementary fluid communicates, on an end remote from the dual-substance nozzle (3), with a divider piston adapter (10), which includes a divider piston (11), which is charged on one side with operating fluid from an M pump (13) and on another side with supplementary fluid from a fill pump (14), and an equal-pressure valve (12) downstream of the divider piston (11).

21. The fuel injection system according to claim 19, in which the feed line (5) for supplementary fluid, on an end remote from the dual-substance nozzle (3), communicates via at least one second 2/2-way valve (MV2) with a further common rail pressure reservoir (30; 70) for receiving supplementary fluid that is under pressure.

22. The fuel injection system according to claim 21, in which the feed line (5) for supplementary fluid, on an end remote from the dual-substance nozzle, communicates with the first inner chamber (42) of a diaphragm adapter (40), which has a diaphragm (43) that divides the first inner chamber (42) sealingly from a second inner chamber (41), and the second inner chamber (41) can be charged with operating fluid, of a metered quantity and at high pressure, and the first inner chamber (42) can be charged with a supplementary fluid.

23. The fuel injection system according to claim 19, in which the feed line (5) for supplementary fluid, on an end remote from the dual-substance nozzle, communicates with the first inner chamber (42) of a diaphragm adapter (40), which has a diaphragm (43) that divides the first inner chamber (42) sealingly from a second inner chamber (41), and the second inner chamber (41) can be charged with operating fluid, of a metered quantity and at high pressure, and the first inner chamber (42) can be charged with a supplementary fluid.

24. A method for operating a dual-substance nozzle (3) according to claim 19, in which the angle β between the longitudinal axis of the nozzle body (3.0) and the flow direction of the supplementary fluid injected into the combustion chamber is adjusted such that the injected supplementary fluid in the combustion chamber meets the simultaneously injected fuel, and by an impetus of the supplementary fuel effects a deflection of at least some of the fuel particles away from the wall of the combustion chamber.

* * * * *

UNITED STATES PATENT AND TRADEMARK OFFICE
CERTIFICATE OF CORRECTION

Page 1 of 1

PATENT NO. : 6,273,032 B1
DATED : August 14, 2001
INVENTOR(S) : Manfred Ruoff et al.

It is certified that error appears in the above-identified patent and that said Letters Patent is hereby corrected as shown below:

<u>Title page,</u>
Item [54], should read as follows:

[54] DUAL-SUBSTANCE NOZZLE FOR INJECTING FUEL AND A SUPPLEMENTARY FLUID

Signed and Sealed this

Fifteenth Day of January, 2002

Attest:

Attesting Officer

JAMES E. ROGAN
*Director of the United States Patent and Trademark Office*